United States Patent [19]
Benetti

[11] Patent Number: 5,372,157
[45] Date of Patent: Dec. 13, 1994

[54] AUTOMATIC BYPASS VALVE

[75] Inventor: Arnaldo Benetti, Modena, Italy

[73] Assignee: P.A. S.r.l., Rubiera, Italy

[21] Appl. No.: 204,475

[22] Filed: Mar. 1, 1994

[30] Foreign Application Priority Data

Jun. 15, 1993 [IT]  Italy .................. MO93A000081

[51] Int. Cl.⁵ .............................................. F16K 17/04
[52] U.S. Cl. ..................................... 137/110; 137/116
[58] Field of Search ..................... 137/110, 115, 116

[56] References Cited

U.S. PATENT DOCUMENTS

| | | | |
|---|---|---|---|
| 2,664,908 | 1/1954 | Strnad | 137/116 |
| 2,665,704 | 1/1954 | Kanuch | 137/110 |
| 2,680,447 | 6/1954 | Groves | 137/116 |
| 3,375,844 | 4/1968 | Mercier et al. | 137/116 |
| 3,457,941 | 7/1969 | Cook | 137/116 |
| 4,481,968 | 11/1984 | Iverson | 137/116 |

FOREIGN PATENT DOCUMENTS 99751  2/1984  European Pat. Off. ............ 137/116

Primary Examiner—Stephen M. Hepperle
Attorney, Agent, or Firm—Darby & Darby

[57]            ABSTRACT

A valve body has three openings: an inlet, an outlet and a flow-back opening, and is provided with an obturator of the flow-back opening and an obturator of the outlet, which outlet obturator is connected by means of a stem with a piston housed in a cylinder communicating with the outlet through a conduit. A recycling conduit places the outlet in communication with a recycling chamber communicating with the flow-back opening through a recycling opening closed by a third obturator, the recycling opening being freed by action of a rod solid to and intervening in conjunction with the second obturator.

3 Claims, 2 Drawing Sheets

AUTOMATIC BYPASS VALVE

BACKGROUND OF THE INVENTION

Automatic bypass valves are specifically, but not exclusively, applied in the field of apparatus controlling the outflow of high-pressure fluids such as, for example, fluids used in washing and cleaning plant machinery.

The invention finds particular application in the field of unloader valves which, when the flow to a user is stopped or reduced, apart from automatically bypassing the fluid, also maintain the fluid delivery branch to the user at a relatively low pressure. This means that the pumping system does not meet, when delivery is recommenced, any resistance due to the presence of a great localized pressure difference in the valve and downstream of it in the flexible delivery pipe, which has its own tap installed in a washing gun at the delivery end.

The prior art teaches valves of this type, essentially consisting in a three-way valve (pump inlet, delivery to user, pump tank return), internally of which a return obturator is provided, normally closed when delivery is under way and open when delivery has been interrupted.

The closing of the obturator is done automatically through a pressure difference between the two end surfaces of a piston connected to the obturator stem. This pressure difference exists only when there is a fluid downflow through the valve delivery outlet. This is made possible by the special conformation of the valve delivery chamber, internally of which a Venturi effect creates a zone of depression connected through an inclined conduit to one of the chambers housing the piston. The obturator is opened automatically when the delivery downflow stops, since the above-mentioned pressure difference is reduced.

Such valves present some drawbacks.

Firstly, a part of the energy possessed by the fluid is dissipated for the sole aim of generating the depression zone automatically controlling the obturator displacement.

Secondly, the forces coming into play regarding the automatic displacement of the obturator are of modest entity and are variable according to the fluid flowrate. This leads to extremely precise and accurate workmethods having to be used in manufacture of the valves; added to which, the nozzle producing the Venturi effect must be suited to the plant flow rate, leading to a need to have the same number of nozzles as utilizable flow rates. Furthermore, the behavior of the return obturator is highly sensitive to even minimum variations in the seal conditions of the piston. A slight increase in friction between the piston and the cylinder, due for example to a calcium deposit, or an infiltration of grit, can cause the mechanism to seize. Wear on the coupling, or hot water flow can generate excessive lateral leakage, reducing the total useful thrust on the piston.

A further drawback is represented by the long response times of the obturator in closing, when the delivery is reopened. This drawback can be obviated by creating a counterpressure in the return chamber, for example by means of an adjustable diaphragm or another choke mechanism, which however constitutes a constructional complication. In certain cases the use of a spring is necessary in order to aid the closing movement of the obturator.

SUMMARY OF THE INVENTION

A principal aim of the invention is to obviate the above-mentioned drawbacks by providing an automatic bypass valve which is efficient and reliable in any situation.

A further aim of the invention is to guarantee the ready response of the by-pass obturator both when delivery is opened and when it is closed.

An advantage of the invention is that it reduces to a minimum the localized losses of fluid energy created during flow through the valve.

BRIEF DESCRIPTION OF THE DRAWINGS

Further characteristics and advantages of the present invention will better emerge from the detailed description that follows, of an embodiment of the invention, illustrated in the form of a non-limiting example in the accompanying drawings, in which.

DESCRIPTION OF THE PREFERRED EMBODIMENTS

Figure 1:
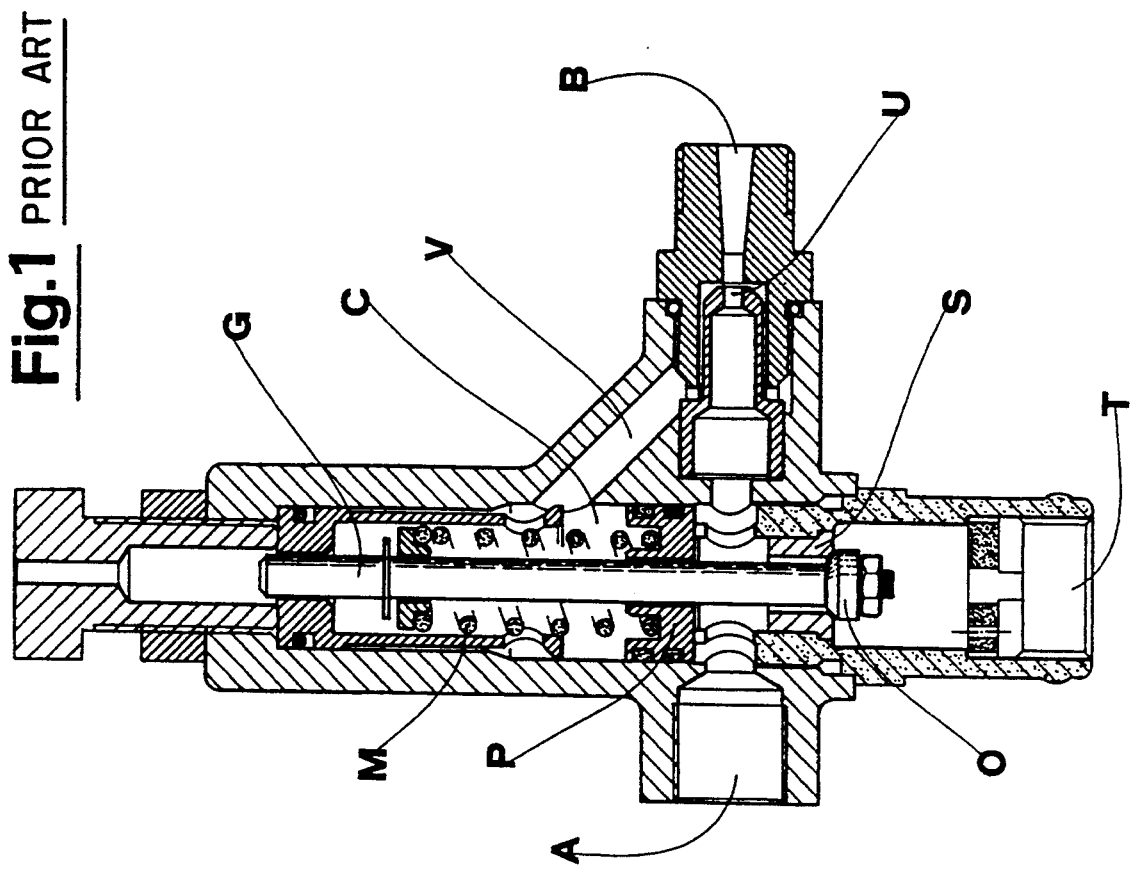
FIG. 1 shows a vertical-elevation schematic section of a prior-art by-pass valve.

To aid illustration of the invention disclosed herein, FIG. 1 is included, with a relative description referring to a known-type valve.

With reference to FIG. 1, A, B and T respectively denote the inlet, delivery outlet and by-pass openings of an unloader valve of known type, in which on shut-down of delivery the delivery conduit to the user is maintained at a relatively low pressure. This valve comprises an obturator O which acts on a hole S arranged between the inlet A and by-pass T.

The obturator O is connected through a stem G to a piston P on which a spring M acts. The upper part of the piston P faces on to a chamber C, communicating through a conduit V with a chamber U opening into the delivery outlet B. The special conformation of the chamber U determines, when the fluid flows through outlet B, a Venturi-type depression in the zone of chamber U that communicates with chamber C. Thus an upwards thrust on piston P is created due to the effect of the pressure difference between the sides of the piston. This thrust maintains the obturator O against opening S. Interruption of the flow through delivery outlet B removes the sustaining pressure on the obturator O, thus freeing the opening S and placing the inlet A in communication with the by-pass T. The pump recycles the fluid through the by-pass T without the physical connection between the pump and the delivery outlet B being closed.

Figure 2:
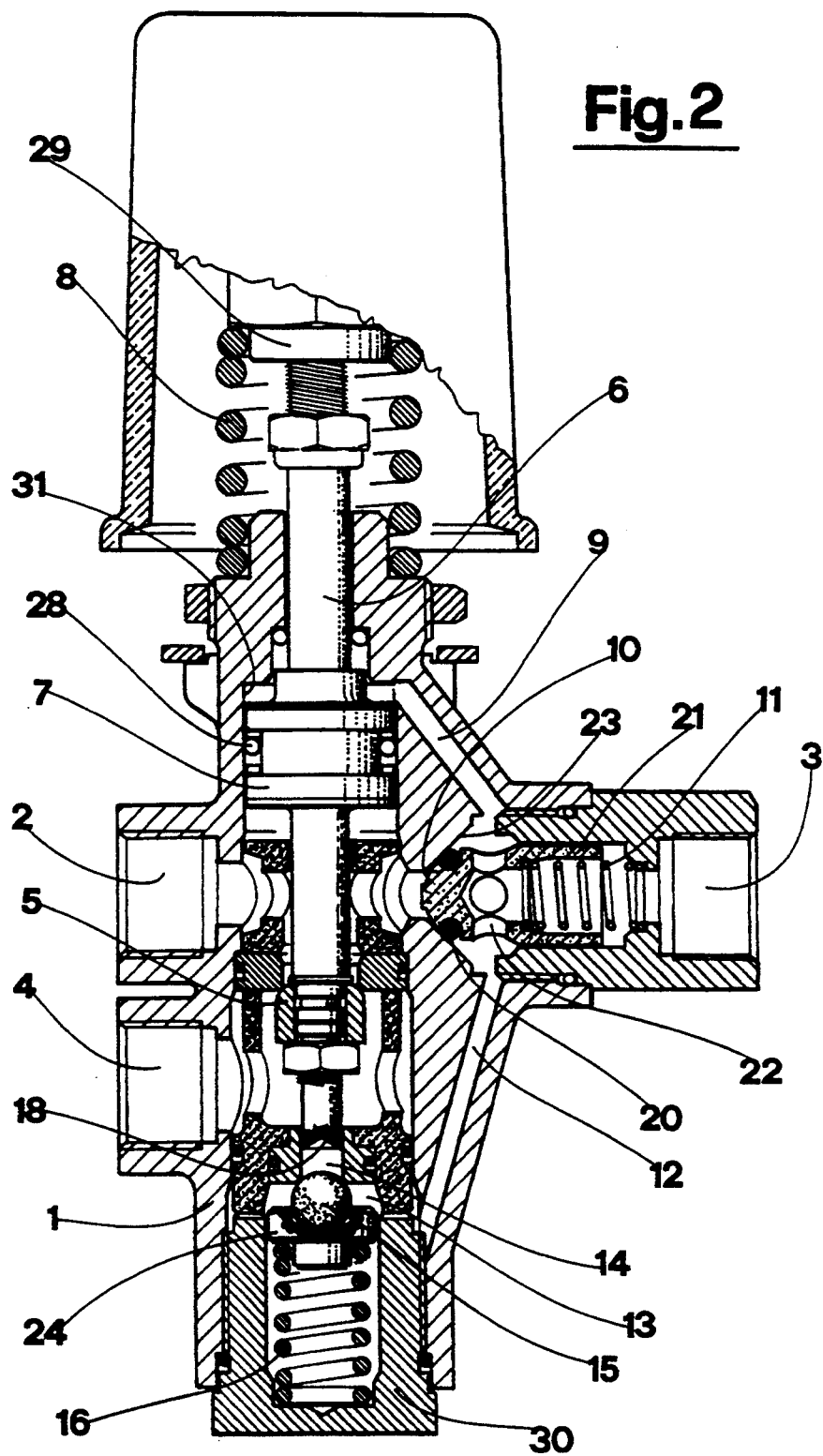
FIG. 2 shows a vertical-elevation schematic section of a first embodiment of the invention.

FIG. 2 shows an automatic by-pass made according to the invention, comprising a valve body 1 provided with an inlet 2, an outlet 3 and a flow-back opening 4.

An obturator 5 closing the flow-back opening 4 is connected by a stem 6 to a piston 7, laterally equipped with a seal washer 28, housed internally of a cylinder 31. The upper surface of the piston 7 communicates with the outlet 3 through an inclined conduit 9. A spring 8 is compressed between the valve body 1 and a plate 29, which plate 29 is solid to the stem 6.

An obturator 10, pushed by a spring 11, acts on the outlet 3. The obturator 10 is constituted by a bush, equipped on its lateral walls with peripheral openings 22, which bush is slidable along a cylindrical seating. A garter seal 20 is arranged on the closed end of the bush of the obturator 10 and seals the obturator 10 in a truncoconical seating 23.

A recycling conduit 12 places the outlet 3 in communication with a recycling chamber 13, which latter communicates with the flow-back opening 4 through a recycling opening 14.

A sphere-obturator 15 is pressed against the recycling opening 14 by a spring 16 having one end engaged on a plate 24 housing the sphere-obturator 15. The degree of compression on the spring 16 of the recycling opening 14 obturator 15 can be axially adjustable from the outside by means of a cover 30 screwed on the valve body 1, since the spring 16 has one end engaged against said cover 30.

The recycling opening 14 sphere-obturator 15 acts coaxially to the flow-back opening 4 obturator 5 stem 6. The stem 6 coaxially bears, at one end, a rod 18 for acting coaxially on the recycling opening 14 sphere-obturator 15 in order to open it.

Figure 3:
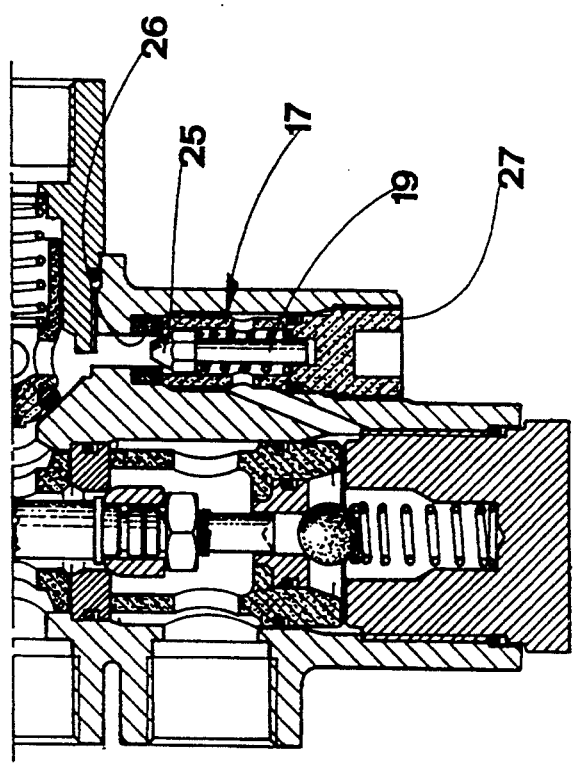
FIG. 3 shows a partial schematic section of a second embodiment of the invention.

FIG. 3 shows a second embodiment of the invention, in which a choke valve 17 is predisposed on the recycling conduit 12. The choke valve 17, which can be calibrated, comprises a needle valve 25 which acts on a seating 26 by means of a spring 19, with an axially adjustable precompression from the outside by means of a screw-in cover 27.

When delivery is full on, the pressurised fluid enters the valve body 1 through the inlet 2, presses on the head of the bush 21 and distances the bush 21 from the seat 23: then it flows through the peripheral openings 22 and exits through the outlet 3 and delivers to the user. The spring 8 maintains the obturator 5 pressed against its seat, closing the flow-back opening 4. The recycling opening 14 is closed by the sphere-obturator 15, by dint of the spring 16.

When delivery is shut off, there is a sudden increase in pressure in the delivery conduit, which determines the closure of the obturator 10, which latter therefore functions as a retaining valve.

The increase in pressure also interests the inclined conduit 9 and the upper chamber of the cylinder, in which the piston 7 can slide. In this way, the piston 7 descends and the flow-back opening 4 is opened.

The rod 18, solid to the piston 7, enters into contact with the sphere-obturator 15, removing it from its seat and opening the recycling opening 14, through which the outlet 3 enters into communication with the flow-back opening 4.

There is thus a drop in pressure in the delivery conduit (which is connected with the outlet 3), up until a situation of equilibrium is reached.

In the second embodiment, illustrated in FIG. 3, the adjustment of the delivery pressure is made by means of the calibration on the choke valve 17, that is, by screwing or unscrewing the screw-in cover 27.

The choke valve 17 also functions as a safety valve for the outlet 3, such that when the obturator 10 is closed it is not necessary to predispose, on the conduit positioned downstream of the outlet 3, a further, overpressure safety valve, which is absolutely necessary for plants having hot water generators.

What is claimed:

1. An automatic bypass valve comprising:
    a valve body having three openings; the three openings being an inlet, an outlet and a flow-back opening;
    a first obturator for closing the flow-back opening;
    a piston, housed in a cylinder;
    a stem for connecting said first obturator to the piston;
    a conduit placing a chamber of said cylinder in communication with the outlet;
    a second obturator for closing the outlet; said second obturator being biased by a spring; said second obturator having also a function of maintaining AN open communication between the outlet and the conduit;
    a recycling conduit placing the outlet in communication with a recycling chamber; said recycling conduit communicating with the flow-back opening through a recycling opening in the valve, on which recycling opening a third obturator operates; a spring for maintaining said third obturator in a position closing the recycling opening;
    a rod, fixed to the second obturator and acting on said third obturator in an opposite direction to a pressure direction of the spring.

2. A valve as in claim 1, wherein the recycling opening is aligned with an axis of the rod, which rod is mobile along said axis solidly to the third obturator.

3. A valve as in claim 1, comprising a choke valve arranged on the recycling conduit and capable of being calibrated externally of the valve.

* * * * *